United States Patent
Chang et al.

(10) Patent No.: US 8,042,155 B1
(45) Date of Patent: Oct. 18, 2011

(54) SYSTEM AND METHOD FOR GENERATING A SINGLE USE PASSWORD BASED ON A CHALLENGE/RESPONSE PROTOCOL

(75) Inventors: Lawrence Wen-Hao Chang, San Francisco, CA (US); Ananthan Subramanian, Menlo Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 804 days.

(21) Appl. No.: 11/540,331

(22) Filed: Sep. 29, 2006

(51) Int. Cl.
*H04L 29/06* (2006.01)
*H04L 29/00* (2006.01)
*H04L 29/12* (2006.01)

(52) U.S. Cl. ........... 726/3; 726/2; 726/4; 726/6; 726/18; 726/20; 726/21; 713/150; 713/168; 713/171; 713/172; 713/176; 709/225; 709/224; 709/227; 709/217

(58) Field of Classification Search .................. None
See application file for complete search history.

(56) References Cited

U.S. PATENT DOCUMENTS

| | | | |
|---|---|---|---|
| 1,310,719 | A | 7/1919 | Vernam |
| 4,262,329 | A | 4/1981 | Bright et al. |
| 4,558,176 | A | 12/1985 | Arnold et al. |
| 4,588,991 | A | 5/1986 | Atalla |
| 4,757,533 | A | 7/1988 | Allen et al. |
| 5,065,429 | A | 11/1991 | Lang |
| 5,150,407 | A | 9/1992 | Chan |
| 5,161,193 | A | 11/1992 | Lampson et al. |
| 5,175,766 | A | 12/1992 | Hamilton |
| 5,185,717 | A | 2/1993 | Mori |
| 5,222,137 | A | 6/1993 | Barrett et al. |
| 5,235,641 | A | 8/1993 | Nozawa |
| 5,235,642 | A | 8/1993 | Wobber et al. |
| 5,265,159 | A | 11/1993 | Kung |
| 5,677,952 | A | 10/1997 | Blakley, III et al. |
| 5,687,237 | A | 11/1997 | Naclerio |
| 5,720,034 | A | 2/1998 | Case |

(Continued)

FOREIGN PATENT DOCUMENTS

WO  WO-00/52875  9/2000

(Continued)

OTHER PUBLICATIONS

Anderson et al., "The Steganographic File System," Information Hiding, Second International Workshop, IH '98 Portland, Oregon. USA, Apr. 14-17, 1998, Proceedings, pp. 73-82, 1998.

(Continued)

*Primary Examiner* — Syed A. Zia
(74) *Attorney, Agent, or Firm* — Cesari and McKenna, LLP

(57) ABSTRACT

A system and method which generates a single use password based on a challenge/response protocol. A box manager module executing within a security appliance identifies a public key (P) and salt value (S) associated with an administrator's smart card and generates a random nonce (N). The box manager transmits a challenge comprising the following elements: <SHA1(N), BM_ID, P[N, BM_ID], S>. Upon receiving the challenge, the administration card decrypts P[N, BM_ID] using the private key contained within the card and computes SHA1(N). The administration card then compares its computed values with the received values from the box manager. If the values match, then to the administration card returns a response comprising the following elements: HMAC_N[user, SHA1 (password, S)], where HMAC_N represents the SHA1 keyed hash message authentication check of the response elements using the nonce N as the key.

20 Claims, 5 Drawing Sheets

U.S. PATENT DOCUMENTS

| | | | |
|---|---|---|---|
| 5,754,651 A | 5/1998 | Blatter et al. | |
| 5,768,373 A * | 6/1998 | Lohstroh et al. | 380/286 |
| 5,870,468 A | 2/1999 | Harrison | |
| 5,931,947 A | 8/1999 | Burns | |
| 5,933,498 A | 8/1999 | Schneck et al. | |
| 5,940,507 A | 8/1999 | Cane | |
| 6,073,237 A | 6/2000 | Ellison | |
| 6,134,660 A | 10/2000 | Boneh et al. | |
| 6,175,924 B1 | 1/2001 | Arnold | |
| 6,185,681 B1 | 2/2001 | Zizzi | |
| 6,185,684 B1 | 2/2001 | Pravetz et al. | |
| 6,212,600 B1 | 4/2001 | Friedman et al. | |
| 6,249,866 B1 | 6/2001 | Brundrett | |
| 6,345,101 B1 | 2/2002 | Shukla | |
| 6,356,941 B1 | 3/2002 | Cohen | |
| 6,370,649 B1 * | 4/2002 | Angelo et al. | 726/18 |
| 6,405,315 B1 | 6/2002 | Burns et al. | |
| 6,414,884 B1 | 7/2002 | DeFelice et al. | |
| 6,507,911 B1 | 1/2003 | Langford | |
| 6,550,011 B1 | 4/2003 | Sims, III | |
| 6,625,734 B1 | 9/2003 | Marvit et al. | |
| 6,636,966 B1 | 10/2003 | Lee et al. | |
| 6,684,222 B1 | 1/2004 | Cornelius et al. | |
| 6,708,272 B1 | 3/2004 | McCown et al. | |
| 6,735,693 B1 | 5/2004 | Hamlin | |
| 6,754,827 B1 | 6/2004 | Cane et al. | |
| 6,792,544 B2 | 9/2004 | Hashem | |
| 6,839,437 B1 | 1/2005 | Crane et al. | |
| 6,851,056 B2 | 2/2005 | Evans | |
| 6,857,076 B1 | 2/2005 | Klein | |
| 6,868,406 B1 | 3/2005 | Ogg et al. | |
| 6,915,435 B1 | 7/2005 | Merriam | |
| 6,993,661 B1 | 1/2006 | Garfinkel | |
| 7,003,674 B1 | 2/2006 | Hamlin | |
| 7,020,779 B1 | 3/2006 | Sutherland | |
| 7,069,439 B1 * | 6/2006 | Chen et al. | 713/172 |
| 7,093,127 B2 | 8/2006 | McNulty et al. | |
| 7,096,355 B1 | 8/2006 | Marvit et al. | |
| 7,120,696 B1 | 10/2006 | Au et al. | |
| 7,136,995 B1 | 11/2006 | Wann | |
| 7,139,917 B2 * | 11/2006 | Jablon | 713/183 |
| 7,146,505 B1 | 12/2006 | Harada et al. | |
| 7,185,192 B1 | 2/2007 | Kahn | |
| 7,215,771 B1 | 5/2007 | Hamlin | |
| 7,222,228 B1 | 5/2007 | Stephens et al. | |
| 7,240,197 B1 | 7/2007 | Yamagami et al. | |
| 7,260,724 B1 | 8/2007 | Dickinson et al. | |
| 7,340,500 B2 | 3/2008 | Traversat et al. | |
| 7,360,073 B1 * | 4/2008 | Billstrom et al. | 713/2 |
| 7,783,898 B2 | 8/2010 | Detrick et al. | |
| 7,840,993 B2 * | 11/2010 | Ganesan et al. | 726/7 |
| 7,904,946 B1 * | 3/2011 | Chu et al. | 726/5 |
| 7,949,148 B2 * | 5/2011 | Rhoads et al. | 382/100 |
| 2001/0054155 A1 | 12/2001 | Hagan et al. | |
| 2002/0046286 A1 | 4/2002 | Caldwell et al. | |
| 2002/0073324 A1 | 6/2002 | Hsu | |
| 2002/0091935 A1 | 7/2002 | Smith et al. | |
| 2002/0114453 A1 | 8/2002 | Bartholet et al. | |
| 2003/0012382 A1 * | 1/2003 | Ferchichi et al. | 380/270 |
| 2003/0028765 A1 | 2/2003 | Cromer et al. | |
| 2003/0074548 A1 * | 4/2003 | Cromer et al. | 713/1 |
| 2004/0073795 A1 * | 4/2004 | Jablon | 713/171 |
| 2004/0163077 A1 * | 8/2004 | Dimpsey et al. | 717/130 |
| 2005/0262343 A1 * | 11/2005 | Jorgensen et al. | 713/168 |
| 2006/0085845 A1 * | 4/2006 | Davis et al. | 726/6 |
| 2007/0058801 A1 | 3/2007 | Plotkin | |
| 2007/0130463 A1 * | 6/2007 | Law et al. | 713/168 |
| 2007/0174634 A1 | 7/2007 | Plotkin | |
| 2007/0244831 A1 * | 10/2007 | Kuo | 705/67 |

FOREIGN PATENT DOCUMENTS

| | | | |
|---|---|---|---|
| WO | WO 02/093314 A2 | 11/2002 | |
| WO | WO 02/093314 A3 | 11/2002 | |

OTHER PUBLICATIONS

Antonelli, et al., "The Packet Vault: Secure Storage of Network Data," CITI Technical Report 98-5, pp. 1-15, Jun. 25, 1998.

Blaze, "Oblivious Key Escrow," Information Hiding, First International Workshop, Cambridge, UK, May 3D-Jun. 1, 1996, Proceedings, pp. 335-343, 1996.

Blaze, "A cryptographic File System for Unix," Proceedings of the First ACM Conference on Computer and Communications Security, pp. 9-16 (1993).

Blaze, "Key Management in an Encrypting File System," USENIX Summer 1994 Technical Conference, pp. 27-35, (Jun. 6-10, 1994).

Boneh, et al., "A Revocable Backup System," In Proceedings 6th USENIX Security Conference, pp. 91-96, 1996.

Cattaneo, et al. "The Design and Implementation of a Transparent Cryptographic Filesystem for UNIX," Proceedings of the FREENIX Track: 2001 UNIX Annual Technical Conference. pp. 199-212 (Jun. 25-30, 2001).

Christy, et al., "Mechanism for Secure Off-Site Computer Access," IBM Technical Disclosure Bulletin. pp. 6754-6756. Apr. 1985.

Clark, "Physical Protection of Cryptographic Devices," Lecture Notes in Computer Science. Advances in Cryptology—Eurocrypt '87, pp. 83-93 (Apr. 13-15, 1987).

Coleman et al., "Mass Storage System Reference Manual: Version 4," Technical Committee on Mass Storage Systems and Technology, IEEE, pp. 1-38, May 1990.

Comba, "Approaches to Cryptographic Key Management," Symposium on Applied Computing. Proceedings of the Northeast ACM Symposium on Personal Computer Security, pp. 38-45 (1986).

Denning, "Cryptography and Data Security," Addison-Wesley Publishing Co., pp. 164-169 and 179, 1982.

Di Crescenzo, et al., "How to Forget a Secret (Extended Abstract)," 16th Annual Symposium on Theoretical Aspects of Computer Science, pp. 500-509 (Mar. 4-6, 1999).

Dietrich, "Security Enclosure With Elastomeric Contact Stripes," IBM Technical Disclosure Bulletin, pp. 444-445, Feb. 1991.

"Disappearing Inc. Makes Old Email Vanish Everywhere; Reduces Corporate Liability as well as Improves Corporate Productivity by Enabling Sensitive Communications via Email-Company Business and Marketing," Edge: Work-Group Computing Report, http://findarticles.com/p/articJes/mLmOWUB/is_1999_0cU 1/aL 56260487/print (Oct. 11, 1999).

Double, "Encryption Key Security By Electric Field Destruction of Memory Cells," IBM Technical Disclosure Bulletin, pp. 8-11, Jan. 1989.

FIPS PUB 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.

FIPS PUB 140-1, "Security Requirements for Cryptographic Modules," Federal Information Processing Standards Publication 140-1, National Institute of Standards and Technology, Jan. 11, 1994, 44 pages.

Flavin, et al., "Data Protection on Magnetic Media Via an Encrypting Controller," IBM Technical Disclosure Bulletin, vol. 3D, No. 3, pp. 1284-1285 (Aug. 1987).

Garfinkel, S., "PGP: Pretty Good Privacy," O'Reilly & Associates, pp. 43 and 65-67, Jan. 1995.

Garfinkel, S., "PGP: Pretty Good Privacy," O'Reilly & Associates, pp. 54-55, 151-153, Jan. 1995.

Garfinkel, S., "Omniva's Self-Destructing Email," Web Security, Privacy and Commerce, Second Edition, O'Reilly & Associates, Inc., Sebastopol, CA, pp. 280-283, Jan. 2002.

Gobioff, Howard, et al., "Security for Networked Attached Storage Devices," Carnegie Mellon University Computer Science Technical Report CMU-CS-97-185, Oct. 1997, 20 pages.

Gobioff, Howard, "Security for a High Performance Commodity Storage Subsystem," Carnegie Mellon University Computer Science Technical Report CMU-CS-99-160, Jul. 1999, 222 pages.

Gobioff, Howard, et al., "Smart Cards in Hostile Environments," Proceedings of the Second USENIX Workshop on Electronic Commerce, pp. 23-28 (Nov. 18-21, 1996).

Graham, et al, "Data Protection at the Volume Level," IBM Technical Disclosure Bulletin, pp. 146-148, Oct. 1988.

Gutmann, "Secure Deletion of Data from Magnetic and Solid-State Memory," Proceedings of the Sixth Annual USENIX Security Symposium: Focusing on Applications of Cryptography, pp. 7-89 (Jul. 22-25, 1996).

Hwang, et al., "An Access Control Scheme Based on Chinese Remainder Theorem and Time Stamp Concept," Computers & Security, vol. 15. No. 1. pp. 73-81, 1996.

IBM Crypto Server Management General Information Manual, First Edition (May 2000), 16 pages.

IBM SecureWay Cryptographic Products IBM 4758 PCI Cryptographic Coprocessor Installation Manual, Security Solutions and Technology Department, Second Edition (Mar. 2000), 34 pages.

IBM Integrated Cryptographic Coprocessors for IBM eServer zSeries 900 and for IBM S/390 Servers (Data sheet), 2000, 4 pages.

IBM SecureWay, UltraCypher Cryptographic Engine (Datasheet) (1998), 2 pages.

IBM 4758 PCI Cryptographic Coprocessor Custom Software Installation Manual, Second Edition, Jan. 2001, 30 pages.

Avoid Litigation: Encrypt Your Data, InfoTech Research Group, Sep. 19, 2006, 6 pages.

Johnson et al., "Self-Destructing Diskette," IBM Technical Disclosure Bulletin, vol. 33, No. 1A, pp. 218-219 (Jun. 1990).

Mallett, "Considerations for Applying Disk Encryptors 10 Environments Subject to Hostile Overrun," IEEE, pp. 218-222, 1991.

Mauriello, "TCFS: Transparent Cryptographic File system," LINUX Journal, Aug. 1, 1997, 8 pages.

Menezes et al., "Handbook of Applied Cryptography," CRC Press, Section 13.7.1, 4 pages, 1997.

Moore, "Preventing Access to A Personal Computer," IBM Technical Disclosure Bulletin, pp. 98-100, Sep. 1992.

Omniva Policy Systems, www.omniva.com, (Aug. 2004), downloaded from web.archive.org on Aug. 24, 2004, 19 pages.

Provos, Niels, "Encrypting Virtual Memory," CITI Technical Report 00-3, Center for Information Technology Integration, University of Michigan, Apr. 25, 2000, 11 pages.

Scherzer. "Memory Protection in Chip Cards," IBM Technical Disclosure Bulletin, pp. 416-417, Oct. 1989.

Schneier, "Applied Cryptography Second Edition: Protocols, Algorithms, and Source Code in C," John Wiley & Sons, Inc. pp. 5, 15, 179-181, 185, 213-214, 225, 229, 563-566 and 569. 1996.

Slusarczuk et al., "Emergency Destruction of Information Storage Media," Institute for Defense Analysis, IDA Report R-321, Dec. 1987, 196 pages.

Smith, "Verifying Type and Configuration of an IBM 4758 Device: A While Paper," IBM T.J. Watson Research Center pp. 1-7 (218/00).

Smith et al., "IBM Research Report: Building a High-Performance, Programmable Secure Coprocessor," IBM Research Division, Computer Science/Mathematics, RC 21102(94393) (Feb. 19, 1998), 61 pages.

Stinson, Douglas R., "Cryptography: Theory and Practice," CRC Press, Mar. 1, 1995, 228 pages.

Vernam, "Cipher Printing Telegraph Systems for Secret Wire and Radio Telegraphic Communications," Journal of the AI EE. pp. 109-115, Feb. 1926.

Weingart, "Physical Security for the uABYSS System," Proceedings 1987 IEEE Symposium on Security and Privacy, pp. 2-58 (Apr. 27-29, 1987), pp. 52-58.

Whitten et al., "Usability of Security: A Case Study," CMU Computer Science Technical Report CMU-CS-98-155. pp. 1-39, Dec. 18, 1998.

Yee et al., "Secure Coprocessors in Electronic Commerce Applications," Proceedings of the First USENIX Workshop of Electronic Commerce, pp. 155-170, Jul. 11-12, 1995.

Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).

Zadok et al., "Cryptfs: A Stackable Vnode Level Encryption File System," Computer Science Department, Columbia University, CUCS-021-98, pp. 1-14, Jun. 1998.

Menezes et al., "Handbook of Applied Cryptography," CRC Press, pp. 1-794, 1997.

Supplementary European Search Report, European Application No. 02734438.1-2212/1388061, PCT/US0215421, Applicant: Decru, Inc., Date of Mailing: Oct. 6, 2010, pp. 1-5.

Plotkin et al., "Encryption Based Security System for Network Storage", U.S. Appl. No. 60/292,088, filed May 17, 2001, 28 pages.

\* cited by examiner

SYSTEM AND METHOD FOR GENERATING A SINGLE USE PASSWORD BASED ON A CHALLENGE/RESPONSE PROTOCOL

The present invention is related to the following commonly assigned U.S. patent application Ser. No. 10/478,386 titled, Encryption Based Security System for Network Storage, filed Nov. 15, 2003, which application is hereby incorporated by reference.

FIELD OF THE INVENTION

The present invention relates to security appliances, and more specifically, to securely logging into a security appliance.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored data using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

SCSI is a peripheral input/output (I/O) interface with a standard, device independent protocol that allows different peripheral devices, such as disks, to attach to a storage system. In SCSI terminology, clients operating in a SAN environment are "initiators" that initiate commands and requests to access data. The storage system is thus a "target" configured to respond to the data access requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

A SAN arrangement or deployment allows decoupling of storage from the storage system, such as an application server, and some level of information storage sharing at the storage system level. There are, however, environments wherein a SAN is dedicated to a single storage system. In some SAN deployments, the information is organized in the form of databases, while in others a file-based organization is employed. Where the information is organized as files, the client requesting the information maintains file mappings and manages file semantics, while its requests (and storage system responses) address the information in terms of block addressing on disk using, e.g., a logical unit number (lun).

A network environment may be provided wherein information (data) is stored in secure storage served by one or more storage systems coupled to one or more security appliances. Each security appliance is configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun. In the context of a NAS environment, the cryptainer may be a collection of files on one or more disks. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

As can be appreciated from the above description, the need to limit access and control of a security appliance is critical to the safety of secure storage. As such, security appliances typically require a high level of authentication before permitting an administrator to perform administrative functions relating to the security appliance. Typically, an to administrator may be required to authenticate with a conventional username/password pair to the security appliance. However such single factor authentication techniques, e.g., only a username/password, do not provide a sufficiently high level of authentication. Alternately, an administrator may be required to utilize a smart card containing a set of cryptographic keys in addition to a username/password pair as a form of the factor authentication. Yet, several noted disadvantages arise by requiring such a two factor authentication technique. A first noted disadvantage involves management of a plurality of security appliances and, in particular, the requirement that an administrator utilize a separate smart card for each of the security appliances in order to perform management functions. As the number of smart cards increases so does the probability of the loss and/or theft of one of the plurality of smart cards.

A second noted disadvantage arises in that by requiring a smart card or other physical token, the administrator may be restricted to use of certain types of computers and/or protocols when accessing (i.e., "logging into") the security appliance to perform management functions. For example, an administrator may log into a world wide web (WWW) based interface adapted to the HTTP protocol using a graphical user interface (GUI) of a web browser executing on a management console having a smart card reader attached thereto. However, should the administrator desire to login to a text base command line interface (CLI) using, e.g., the SSH protocol a disadvantage arises, as conventional SSH management consoles ("clients") generally do not include interfaces to smart card readers. Thus, an administrator may be required to utilize nonstandard SSH clients, which may not be available for all systems that an administrator may desire to utilize as management consoles.

SUMMARY OF THE INVENTION

The disadvantages of the prior art are overcome by providing a system and method for generating a single use password based on a challenge/response protocol to enable authentication of an administrator to a security appliance or other computer. According to an illustrative authentication procedure, an administrator logs into the security appliance by inserting its administration smart card into a card reader of a management console and entering its username and password. In response, the management console issues a challenge request to the security appliance to verify the identity of the administrator. In response, a box manager module executing within the security appliance identifies a public key (P) and salt value (S) associated with the administrator and the administration smart card and generates a random nonce (N). The box manager associates the random nonce with the administrator's user name or identification (ID) within the security appliance and saves the nonce. The box manager then transmits a challenge having the following elements: <SHA1(N), BM_ID, P[N, BM_ID], S>, where SHA1(N) represents a secure hash algorithm of the nonce N, BM_ID represents an ID of the box manager and P[N, BM-ID] represents the nonce N and the box manager ID encrypted with the public key P associated with the smart card.

Upon receiving the challenge, the administration smart card decrypts P[N, BM_ID] using a private key contained within the card and computes SHA1(N). The administration card then compares its decrypted/computed values with the received values from the box manager. If the values match, then the administration card returns a response having the following elements: HMAC_N[user, SHA1 (password, S)], where HMAC_N represents the SHA1 keyed hash message authentication code of the response elements using the nonce N as the key, user represents the user ID associated with the administrator and SHA1(password, S) represents a SHA1 hash of the password and salt S.

Upon receiving the response, the box manager identifies N based on the user ID associated with the administrator and computes HMAC_N[user, SHA1 (password, S)]. If the computed value matches the received value, then the nonce N is destroyed and the login is authenticated (accepted). However, if the values do not match, then the nonce N is destroyed and the login is denied.

In an alternate embodiment, the administration smart card may display the response, i.e., HMAC_N[user, SHA1 (password, S)], to a user in, e.g., a graphical user interface. The administrator may then log in using, e.g., SSH to the security appliance using their regular username and the displayed response as a password, thereby enabling two factor authentication using conventional SSH clients.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
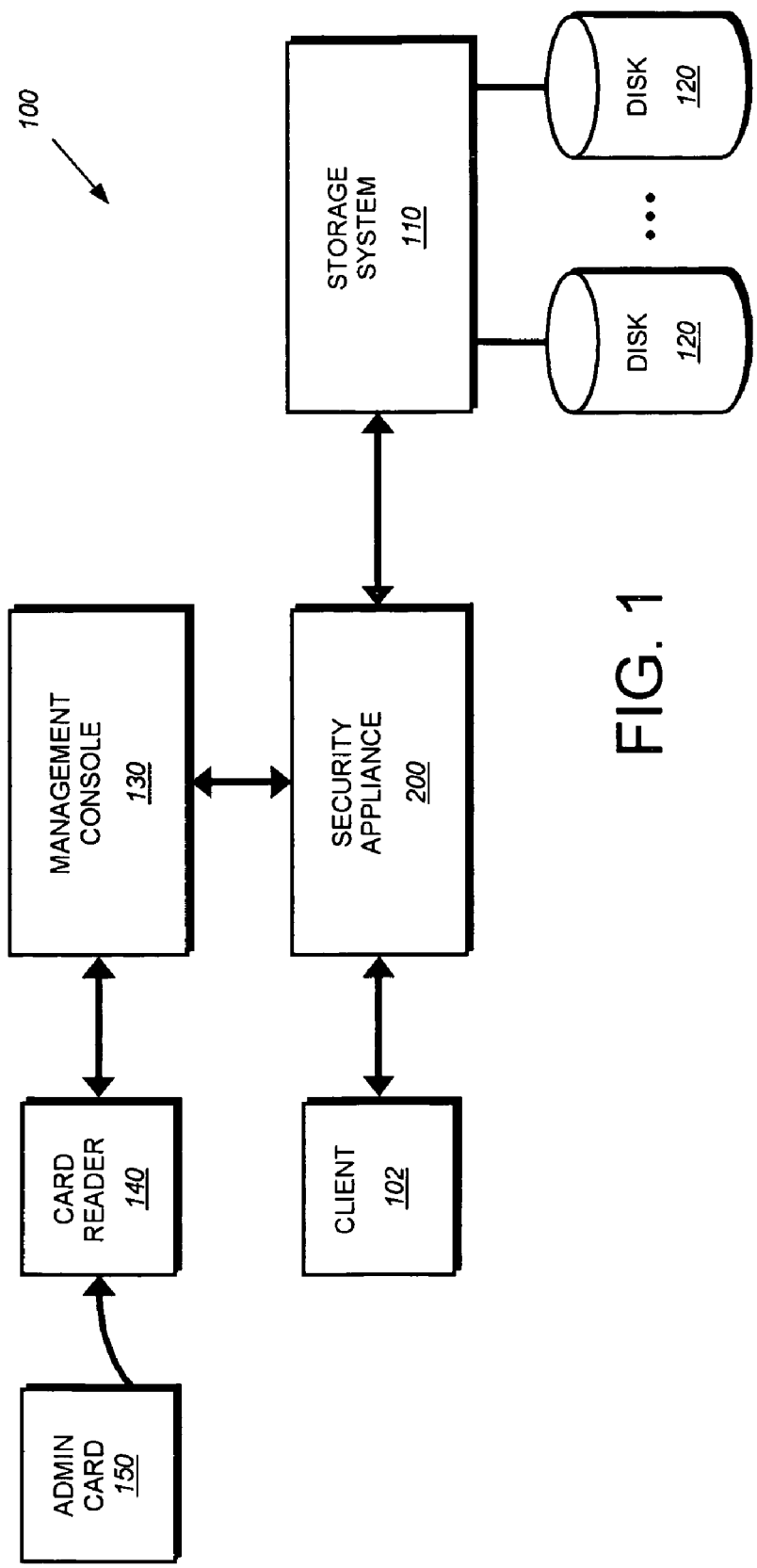
FIG. 1 is a schematic block diagram of an environment including a multi-protocol security appliance that may be advantageously used with the present invention.

FIG. 1 is a schematic block diagram of an environment 100 including a multi-protocol security appliance 200 that may be advantageously used with the present invention. The security appliance 200 is coupled between one or more clients 102 and one or more storage systems 110, such as an application server or filer. The security appliance 200, which is configured to act as an encryption proxy, intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in encrypted form. The security appliance 200 then decrypts the encrypted data and returns the decrypted data to the client 102.

In the illustrative embodiment, the security appliance employs a conventional encryption algorithm, e.g., the Advanced Encryption Standard (AES) or other appropriate algorithms, to transform unencrypted data (cleartext) generated by the clients 102 into encrypted data (ciphertext)

intended for secure storage, i.e., one or more cryptainers, on the storage system 110. To that end, the security appliance illustratively uses a high-quality, software or hardware-based pseudo random number generation technique to generate encryption keys. The encryption and decryption operations are performed using these encryptions keys, such as a cryptainer key associated with each cryptainer. As described herein, the security appliance 200 uses an appropriate cryptainer key to encrypt or decrypt portions of data stored in a particular cryptainer. In addition to performing encryption and decryption operations, the security appliance 200 also performs access control, authentication, virtualization, and secure-logging operations.

The security appliance 200 is also coupled to a management console 130 comprising a computer adapted to execute appropriate software for interfacing with the security appliance. Illustratively, the management console is a Microsoft® Windows®-based computer executing a web browser capable of interfacing with the security appliance via the HTTP protocol. In alternate embodiments, the management console also includes a SSH client to enable administrators to utilize a CLI for interfacing with the security appliance. Operatively interconnected with the management console 130 is a smart card reader 140 adapted to receive an administration smart card 150. As described herein, the management console 130 uses the smart card 150 to enable the generation of a single use password in accordance with an embodiment of the present invention. The administration smart card 150 is associated with an administrator and illustratively includes a public/private key pair stored thereon.

Figure 2:
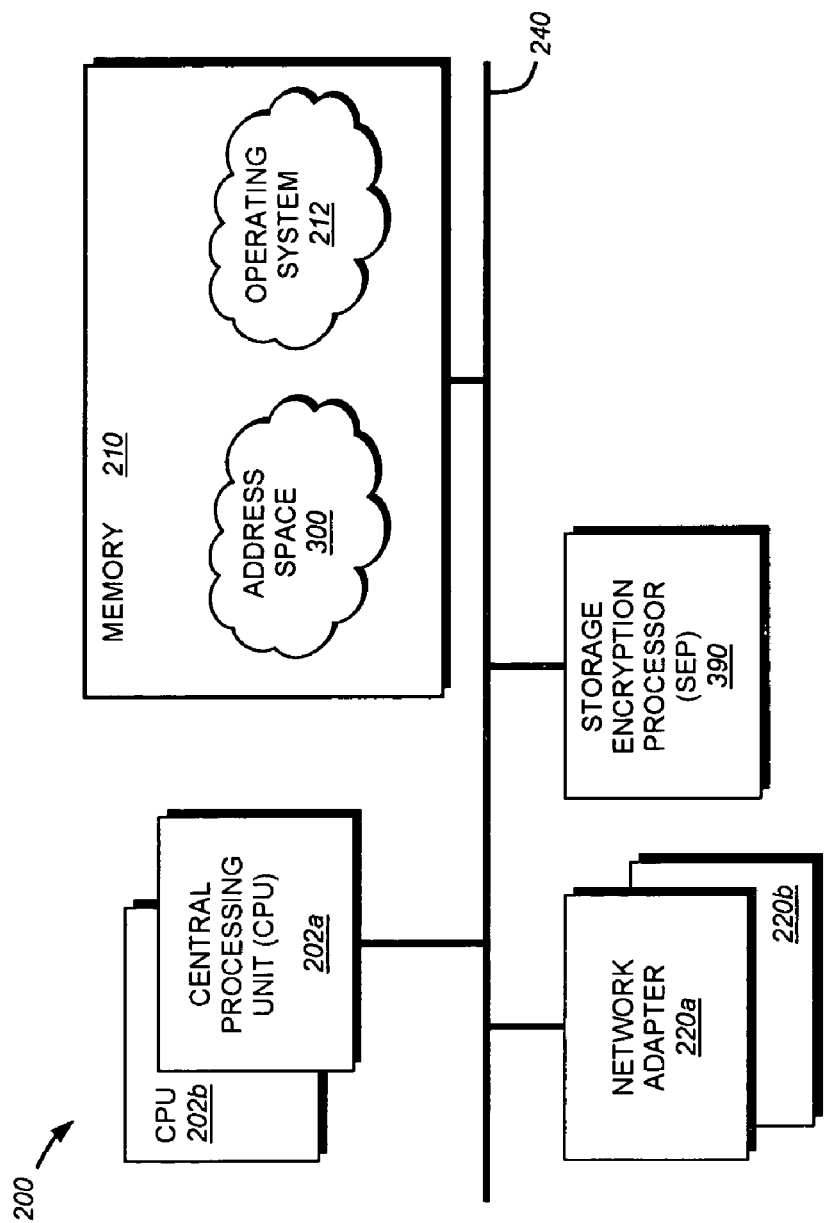
FIG. 2 is a schematic block diagram of the multi-protocol security appliance that may be advantageously used with the present invention.

FIG. 2 is a schematic block diagram of the multi-protocol security appliance 200 that may be advantageously used with the present invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 220a,b), a memory 210, one or more network adapters 220a,b and a storage encryption processor (SEP 390) interconnected by a system bus 240, such as a conventional Peripheral Component Interconnect (PCI) bus. The SEP 390 is configured to perform all encryption and decryption operations for the security appliance in a secure manner; for example, the SEP is configured to protect plaintext encryption keys from system software executing on each CPU 202. Accordingly, the SEP is illustratively embodied as a FIPS 140-2 certified module that is connected to a dedicated interface card or other similar card.

The network adapters 220 couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

Figure 3:
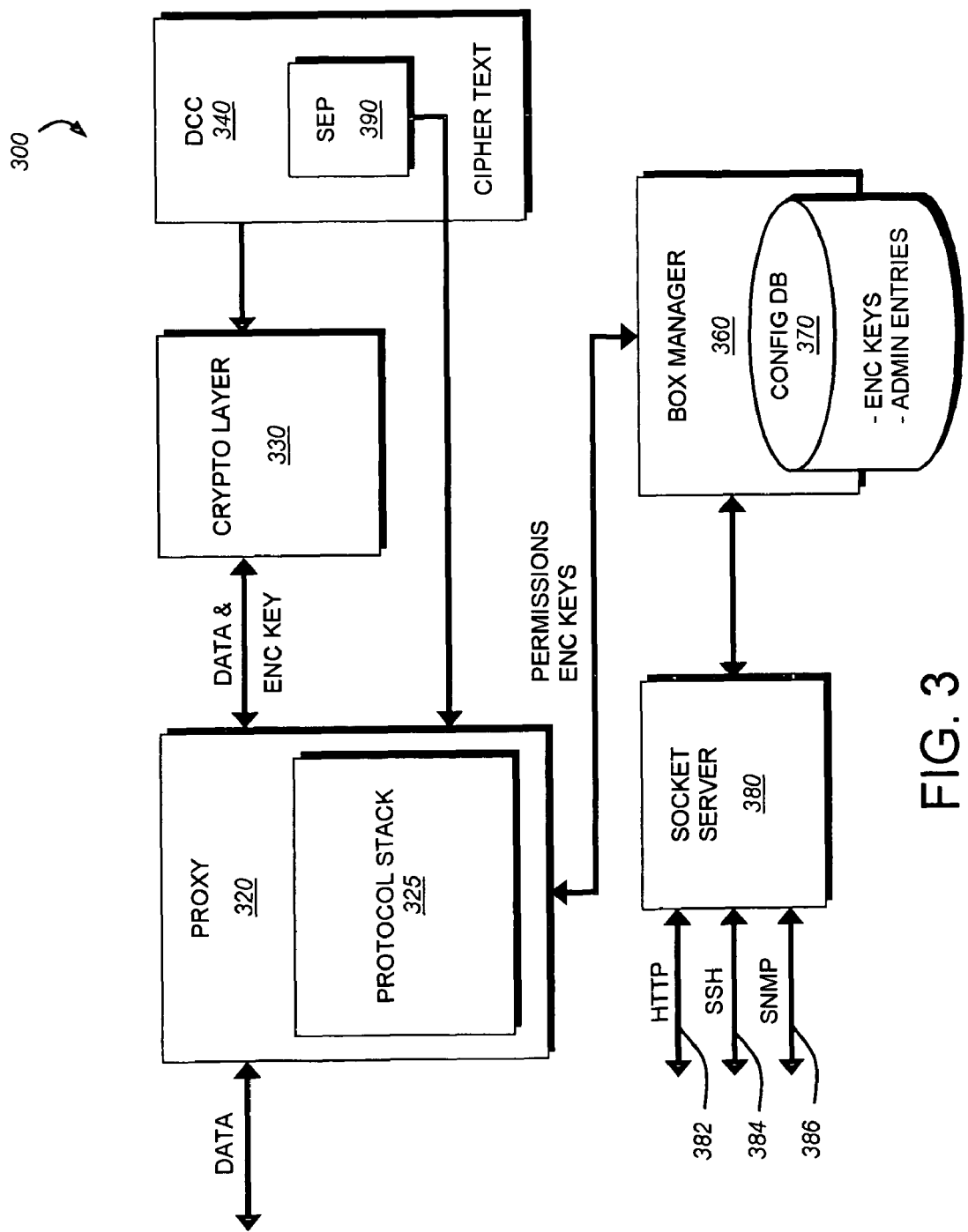
FIG. 3 is a schematic diagram illustrating an arrangement of software processes and modules executing on the security appliance in accordance with the present invention.

The operating system 212 illustratively organizes the memory 210 into an address space arrangement available to the software processes and modules executing on the processors. FIG. 3 is a schematic diagram illustrating an arrangement 300 of software processes and modules executing on the security appliance 200 in accordance with the present invention. In the illustrative embodiment, the operating system software is a customized version of a Unix type operating system, although other operating systems may be used.

For both NAS and SAN environments, data is received at a proxy 320 of the security appliance. The proxy 320 is illustratively embodied as, e.g., the network protocol stack 325 configured to interpret the protocol over which data is received and to enforce certain access control rules based on one or more policies. Each policy is served by a box manager 360. The box manager 360 is illustratively embodied as a database application process configured to manage a configuration repository or database (Config DB 370) that stores, e.g., encrypted keys and administrator entries. The administrator entries illustratively include, e.g., a random salt S, or other suitable seed value, to hash the administrator's password, a copy of the public key associated with an administration card, etc. As the configuration database 370 of each security appliance may store the public key associated with a smart card, a single administration smart card may be utilized with any number of security appliances.

A socket server 380 provides interfaces to the box manager 360, including (i) an HTTP web interface 382 embodied as, e.g., a graphical user interface (GUI) adapted for web-based administration, (ii) a SSH interface 384 for command line interface (CLI) command administration, and (iii) an SNMP interface 386 for remote management and monitoring.

Specifically, the box manager 360 supplies the permissions and encrypted keys to the proxy 320, which intercepts data access requests and identifies the sources (clients 102) of those requests, as well as the types of requests and the storage targets (cryptainers) of those requests. The proxy also queries the box manager for permissions associated with each client and, in response, the box manager 360 supplies the appropriate permissions and encrypted key (e.g., a cryptainer key). The proxy 320 then bundles the data together with the encrypted key and forwards that information to a crypto process (layer) 330 that functions as a "wrapper" for the SEP 390. The SEP illustratively resides on an interface card, which is hereinafter referred to a data crypto card (DCC 340).

The crypto layer 330 interacts with the DCC 340 by accessing (reading and writing) registers on the DCC and, to that end, functions as a PCI interface. Illustratively, a descriptor queue is used by the crypto layer to access the DCC by, e.g., supplying starting and ending points of data, as well as offsets into the data and the encrypted keys used to encrypt the data. The DCC 340 includes one or more previously loaded keys used to decrypt the supplied encrypted keys; upon decrypting an encrypted key, the DCC uses the decrypted key to encrypt the supplied data. Upon completion of encryption of the data, the DCC returns the encrypted data as ciphertext to the proxy 320, which forwards the encrypted data to the storage system 110.

Notably, the security appliance 200 "virtualizes" storage such that, to a client 102, the appliance appears as a storage system 110 whereas, from the perspective of the storage system, the security appliance appears as a client. Such virtualization requires that security appliance manipulate (IP) addresses with respect to data access requests and responses. Illustratively, certain customizations to the network protocol stack 325 of the proxy 320 involve virtualization optimizations provided by the appliance. For example, the security appliance 200 manipulates (changes) the source and destination IP addresses of the data access requests and responses.

The present invention provides a system and method for generating a single use password based on a challenge/response protocol to enable authentication of an administrator to a security appliance or other computer. According to an illustrative authentication procedure, an administrator logs into the security appliance by inserting its administration smart card into a card reader of a management console and entering its username and password. In response, the management console issues a challenge request to the security appliance to verify the identity of the administrator. In response, a box manager module executing within the security appliance identifies a public key (P) and salt value (S) associated with the administrator and the administration smart card and generates a random nonce (N). As will be appreciated by one skilled in the art, a nonce is a value that is typically only used once, i.e., an ephemeral value, that is used for one purpose and then discarded. More generally, the nonce N may be represented by any suitable bit pattern, e.g., the value may be the output from a random number generator. The box manager associates the random nonce with the administrator's user name or identification (ID) within the security appliance and saves the nonce. The box manager then transmits a challenge having the following elements: <SHA1 (N), BM_ID, P[N, BM_ID], S>, where SHA1(N) represents a secure hash algorithm of the nonce N, BM_ID represents an ID of the box manager and P[N, BM-ID] represents the nonce N and the box manager ID encrypted with the public key P associated with the smart card. A secure hash algorithm illustratively acts as a deterministic function that may accept a variable length input and produce a fixed length output. Illustratively, the secure hash function does not generate collisions, i.e., no two differing inputs produce identical outputs.

Upon receiving the challenge, the administration smart card decrypts P[N, BM_ID] using a private key contained within the card and computes SHA1(N). The administration card then compares its decrypted/computed values with the received values to from the box manager. If the values match, then the administration card returns a response having the following elements: HMAC_N[user, SHA1 (password, S)]. Illustratively, HMAC_N represents the SHA1 keyed hash message authentication code of the response elements using the nonce N as the key. The user element represents the user ID associated with the administrator, while the SHA1(password, S) element represents a SHA1 hash of the password and salt S. A hash message authentication code is illustratively utilized to ensure the authenticity and data integrity of a message.

Upon receiving the response, the box manager identifies N based on the user ID associated with the administrator and computes HMAC_N[user, SHA1(password, S)]. If the computed value matches the received value, then the nonce N is destroyed and the login is authenticated (accepted). However, if the values do not match, then the nonce N is destroyed and the login is denied.

In an alternate embodiment, the administration smart card may display the response, i.e., HMAC_N[user, SHA1 (password, S)], to a user in, e.g., a graphical user interface. The administrator may then log in using, e.g., SSH to the security appliance using their regular username and the displayed response as a password, thereby enabling two factor authentication using conventional SSH clients.

Figure 4:
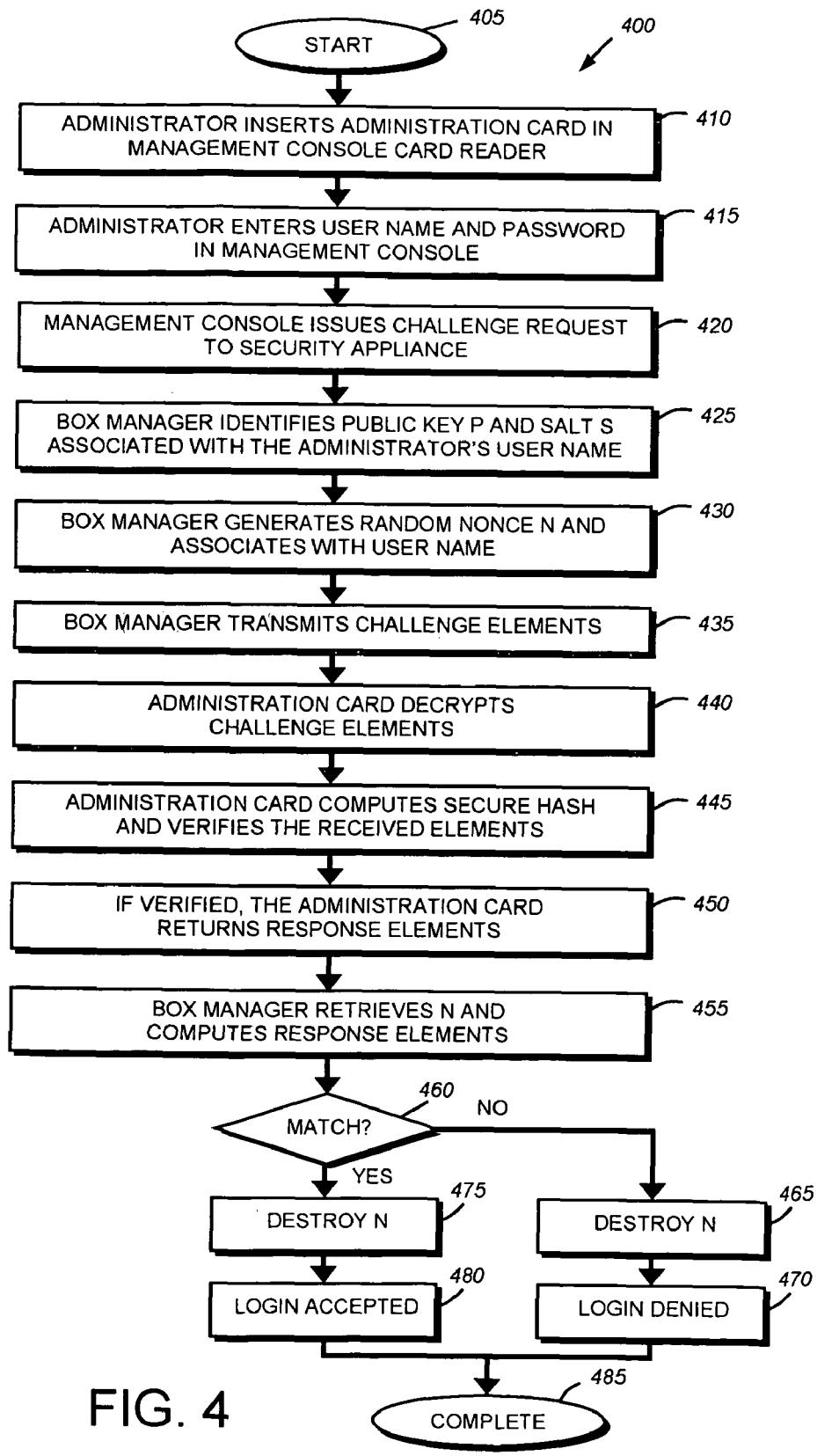
FIG. 4 is a flowchart detailing the steps of a procedure for performing two factor authentication using a single use password in response to a challenge/response protocol in accordance with an embodiment of the present invention.

FIG. 4 is a flowchart detailing the steps of a procedure for performing two factor authentication using a single use password generated in response to a challenge/response protocol in accordance with an illustrative embodiment of the present invention. The procedure 400 begins in step 405 and continues to step 410 where the administrator initiates a login operation by inserting its administration card 150 into the management console's card reader 140 and then entering its administrator username and password into, e.g., an exemplary web-based user interface on the management console in step 415. It should be noted that while the present invention is written in terms of authenticating an administrator, the principles of the present invention may be utilized to authenticate any entity, including, for example, a software process executing on a computer operatively interconnected with a security appliance. As such, the description of authentication an to administrator/user should be taken as exemplary only. In response, the management console issues a challenge request to the security appliance in step 420. This request is illustratively embodied as a command to the security appliance to generate a challenge to authenticate the administrator.

In response to receiving the challenge request, the box manager, in step 425, identifies the public key (P) and the salt (S) associated with the administrator's username. The box manager then generates a random nonce (N) and associates N with the administrator's username. Illustratively, the nonce N is stored within the configuration database 370 within an administration entry. In alternate embodiments, the box manager 360 may maintain N in memory 210 to enable it to be easily recalled later during the authentication procedure. Once N has been associated with the user name, the box manager transmits a challenge to the management console of in step 435. The challenge illustratively comprises the following elements: <SHA1(N), BM_ID, P[N, BM_ID], S>, wherein SHA1(N) represents the secure hash algorithm of the nonce N; BM_ID represents the ID of the box manager performing the authentication; P[N, BM_ID] is the encryption of the nonce and the box manager ID using the previously identified public key; and the salt value S.

The administration smart card decrypts P[N, BM_ID] in step 440 using, e.g., the private key associated with P that is part of the private/public key stored within the administration card. Furthermore, the administration card computes SHA1 (N) and verifies the received SHA1(N) and BM_ID in step 445. If they agree with each other, i.e. if the received SHA1 (N) and BM_ID match the computed values, the administration card then returns a response in step 450. Illustratively, the response comprises the following elements: <HMAC_N [user, SHA1 (password, S)]>, where HMAC_N represents the keyed hash message authentication code utilizing the nonce N as the key. The user value is illustratively a user ID value associated with the username of the administrator and SHA1 (password, S) represents a SHA1 hash of the password and salt value.

The box manager receives the response and retrieves N based on the username from, e.g., an administrator entry kept in memory. Once N has been retrieved, the box manager computes HMAC_N [user, SHA1(password, S)] and compares it with the received response from the administration card in step 455. A determination is made in step 460 whether they match. If they do not match, then the procedure branches to step 465 and N is destroyed before the login is denied in step 470. The procedure 400 then completes in step 485. However, if in step 460 there is a match, then N is destroyed in step 475 before the login is accepted in step 480. The procedure 400 then completes in step 485. Note that, the nonce N may be destroyed by, e.g., deleting it from memory, to ensure that it may not be utilized in a security attack on the security appliance.

Figure 5:
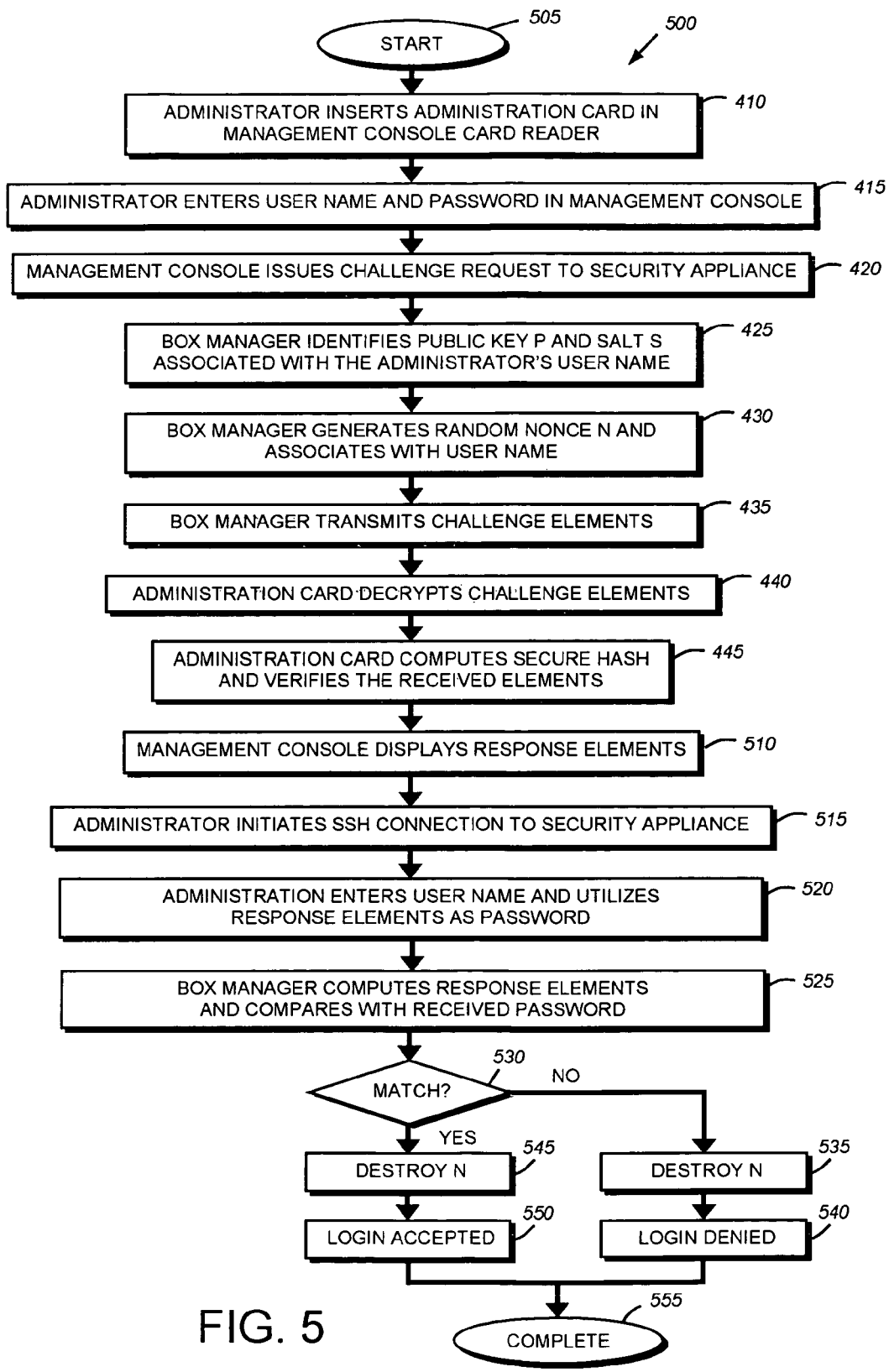
FIG. 5 is a flowchart detailing the steps of a procedure for performing a two factor authentication using a conventional SSH client in accordance with an embodiment of the present invention.

FIG. 5 is a flow chart detailing the steps of a procedure 500 for performing a two factor authentication using a conventional SSH client in accordance with an illustrative embodiment of the present invention. The procedure 500 begins in step 505 and continues to steps 410-445, which are identical to the steps previously described above in reference to procedure 400, i.e., an administrator initiates an authentication procedure wherein a challenge is generated and sent to the management console. The management console creates a response and then, in step 510, the management console displays the computed response <HMAC_N[user, SHA1 (password, s)]> to the user. The administrator may then initiate a SSH connection to the security appliance in step 515 using a conventional SSH client. It should be noted that the management console executing a conventional SSH client may be geographically remote from the console executing the GUI and having a smart card reader. Thus, an administrator physical present at the GUI based management console may cause the computed response to be displayed. The administrator may then communicate the computed response to a second administrator remotely located with only access to a SSH client by, e.g., reading the response over a telephone link or other communication channel.

The administrator enters its username and utilizes the displayed response as a password. In response, the box manager computes HMAC_N[user, SHA1(password, S)] and compares the received password with the computed value in step 525. A determination is made in step 530 whether they match. If they do not match, then the procedure branches to step 535 and N is destroyed before the login is denied in step 540. The procedure then completes in step 555. However, if in step 530 it is determined that there is a match, then N is destroyed in step 545 and the SSH is accepted in step 550. The procedure then completes in step 555.

The foregoing description has been directed to specific embodiments of this invention. It will be apparent, however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. It should be noted that while the description has been written in terms of the SHA1 and HMAC functions, any suitable secure hash and/or message authentication code may be utilized. As such, the use of SHA1 and HMAC should be taken as exemplary only. Furthermore, the use of a nonce N should be taken as exemplary only. In alternate embodiments, any bit pattern may be utilized in place of the nonce N. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for secure authentication, comprising:
issuing, by a management console, a challenge request to a security appliance in response to an entity inserting a smart card and entering a username and a password into the management console to verify the identity of the entity;
in response to receiving the request issued by the management console, identifying, by the security appliance, a public key and a salt value stored on the security appliance wherein the public key and the salt value are associated with the entity and the smart card inserted by the entity into the management console;
generating, on the security appliance, a bit pattern, the bit pattern associated with the username of the entity and stored in the security appliance;
sending a challenge to the management console, the challenge including a secure hash of the bit pattern, an identification value associated with the security appliance, a version of the bit pattern and identification value encrypted with the public key, and the salt value;
is in response to receiving the challenge, decrypting, by the smart card, the version of the bit pattern and identification value using a private key contained within the smart card;
using, on the management console, the decrypted bit pattern to compute the secure hash received from the security appliance;
comparing, on the management console, the decrypted security appliance identification value and computed secure hash of the bit pattern with the security appliance identification value and secure hash of the bit pattern received from the security appliance in the challenge to determine if they match;
in response to a match of the comparison, returning, by the management console, a response to the security appliance, the response including a keyed hash message authentication code (HMAC), wherein the associated bit pattern is used as a key to encrypt the HMAC;
utilizing the bit pattern stored on the security appliance and associated with the entity's username to compute the keyed HMAC received from the management console;
matching the computed keyed HMAC with the received keyed HMAC at the security appliance; and
in response to matching the computed keyed HMAC with the received keyed HMAC at the security appliance, authenticating the entity.

2. The method of claim 1 wherein the entity comprises a software process.

3. The method of claim 1 wherein the identification value comprises an identification of the security appliance to which the entity is being authenticated.

4. A method for securely authenticating an administrator to a computer, comprising:
issuing a challenge request to the computer;
in response to receiving the challenge request, identifying, by the computer, a public key and a salt value;
generating, by the computer, a nonce to be stored on the computer, wherein the public key and the salt value are associated with an administrator and a smart card inserted by the administrator;
generating a challenge comprising a secure hash of the nonce, an identification associated with the computer, the salt value and a version of the nonce and identification value that is encrypted with the public key;
sending the challenge to the smart card;
in response to receiving the challenge, decrypting, by the smart card, the version of the nonce and identification value using a private key contained within the smart card;
is using the decrypted nonce to compute the secure hash of the nonce;
comparing the decrypted computer identification value and computed secure hash of the nonce with the computer identification value and secure hash of the nonce received from the computer in the challenge to determine if they match;
in response to a match of the comparison, returning a response to the computer, the response including a message authentication code, wherein the associated nonce is used as a key to encrypt the message authentication code;
utilizing the nonce stored on the computer and associated with the user's username to compute the received message authentication code;
matching the computed message authentication code with the received message authentication code on the computer; and
in response to matching the computed message authentication code with the received message authentication code on the computer, authenticating the user.

5. The method of claim 4 wherein the secure hash comprises the SHA1 algorithm.

6. The method of claim 4 wherein the identification of the computer comprises a box manager identifier.

7. The method of claim 4 wherein the message authentication code comprises a keyed hash message authentication code.

8. The method of claim 4 wherein the computer comprises a security appliance.

9. The method of claim 4 wherein the computer computes the message authentication code of the user identifier and a secure hash of the password and the salt value.

10. The method of claim 4 further comprising accepting a login in response to the computed message authentication code of the user identifier and a secure hash of the password and the salt value equaling the response.

11. The method of claim 10 further comprising destroying the nonce.

12. The method of claim 4 further comprising displaying the response.

13. The method of claim 12 further comprising initiating a login operation to the computer using the displayed response as a password.

14. The method of claim 10 wherein the login operation utilizes aSSH protocol.

15. A non-transitory computer readable medium for securely authenticating a user to a computer, the computer readable medium containing executable program instructions for execution by a processor, comprising:
program instructions that issue a challenge request to the computer;
program instructions that identify, on the computer, a public key and a salt value in response to receiving the challenge request;
program instructions that generate, on the computer, a nonce to be stored on the computer, wherein the public key and the salt value are associated with the user and a smart card inserted by the user;
program instructions that generate a challenge, the challenge comprising of a secure hash of the nonce, an identification value associated with the computer, the salt value and a version of the nonce and identification value encrypted with the public key;
program instructions that send the challenge to the smart card;
program instructions that decrypt, on the smart card, the version of the nonce and identification value using a private key contained within the smart card in response to receiving the challenge;
program instructions that use the decrypted nonce to compute the secure hash of the nonce;
program instructions that compare the decrypted computer identification value and computed secure hash of the nonce with the computer identification value and secure hash of the nonce received from the computer in the challenge to determine if they match;
program instructions that return a response to the computer, the response including a keyed hash message authentication code (HMAC), wherein the associated nonce is used as a key to encrypt the HMAC in response to a match;
program instructions that utilize the nonce stored on the computer and associated with the username of the user to compute the received keyed HMAC;
program instructions that match the computed keyed HMAC with the received keyed HMAC on the computer; and
program instructions that authenticate the user in response to a match.

16. A system for securely authenticating a user to a computer, the system comprising:
a management console operatively interconnected with the computer, the management console configured to issue a challenge request to the computer;
wherein the computer is configured to, in response to receiving the challenge request, identify a public key and a salt value, generate a nonce to be stored on the computer, wherein the public key and the salt value are associated with the user and a smart card inserted by the user, generate a challenge comprising a secure hash of the nonce, an identification value associated with the computer, the salt value and a version of the nonce and identification value encrypted with the public key, and send the challenge to the smart card;
the management console further configured to decrypt the version of the nonce and identification value using a private key contained within the smart card in response to receiving the challenge, use the decrypted nonce to compute the secure hash of the nonce, compare the decrypted computer identification value and computed secure hash of the nonce with the computer identification value and secure hash of the nonce received from the computer in the challenge to determine if they match, and return a response to the computer, the response including a keyed hash message authentication code (HMAC), wherein the associated nonce is used as a key to encrypt the HMAC in response to a match of the comparison;
the computer further configured to utilize the nonce stored on the computer and associated with the username of the user to compute the received keyed HMAC, match the computed keyed HMAC with the received keyed HMAC on the computer, and authenticate the user in response to matching the computed keyed HMAC with the received keyed HMAC on the computer.

17. The system of claim 16 wherein the management console is further configured to display the response to the user.

18. The system of claim 17 wherein the management console further comprises a text based client configured to enable the user to login to the computer using the displayed response as a password.

19. The system of claim 17 further comprising a computer executing a text based client configured to enable the user to login to the computer using the displayed response as a password and wherein the computer is geographically remote from the management console.

20. The system of claim 18 wherein the computer comprises a security appliance.

* * * * *

UNITED STATES PATENT AND TRADEMARK OFFICE
CERTIFICATE OF CORRECTION

PATENT NO. : 8,042,155 B1  Page 1 of 1
APPLICATION NO. : 11/540331
DATED : October 18, 2011
INVENTOR(S) : Lawrence Wen-Hao Chang It is certified that error appears in the above-identified patent and that said Letters Patent is hereby corrected as shown below:

Title page item [57] should read
 A system and method which generates a single use password based on a challenge/response protocol. A box manager module executing within a security appliance identified a public key (P) and salt value (S) associated with an administrator's smart card and generates a random nonce (N). The box manager transmits a challenge comprising the following elements: <SHA1(N), BM_ID, P[N, BM_ID], S>. Upon receiving the challenge, the administration card decrypts P[N, BM_ID] using the private key contained within the card and computes SHA1(N). The administration card then compares its computed values with the received values from the box manager. If the values match, then to the administration card returns a response comprising the following elements: HMAC_N[user, SHA1 (password, S)], where HMAC_N represents the SHA1 keyed hash message authentication check of the response elements using the nonce N as the key.

In Col. 2, line 61 should read:
 relating to the security appliance. Typically, an to administra- In Col. 7, line 54 should read:
 received values to from the box manager. If the values match In Col. 8, line 27 should read:
 appliance. As such, the description of authentication an to In Col. 10, line 26, claim 1 should read:
 is in response to receiving the challenge, decrypting, by the In Col. 11, line 8, claim 4 should read:
 is using the decrypted nonce to compute the secure hash of Signed and Sealed this
Fifteenth Day of May, 2012

David J. Kappos
*Director of the United States Patent and Trademark Office*